Jan. 15, 1929.
W. A. WINKIE
1,699,086
HAMBURGER CAKE FORMING APPARATUS
Filed March 26, 1928     2 Sheets-Sheet 1
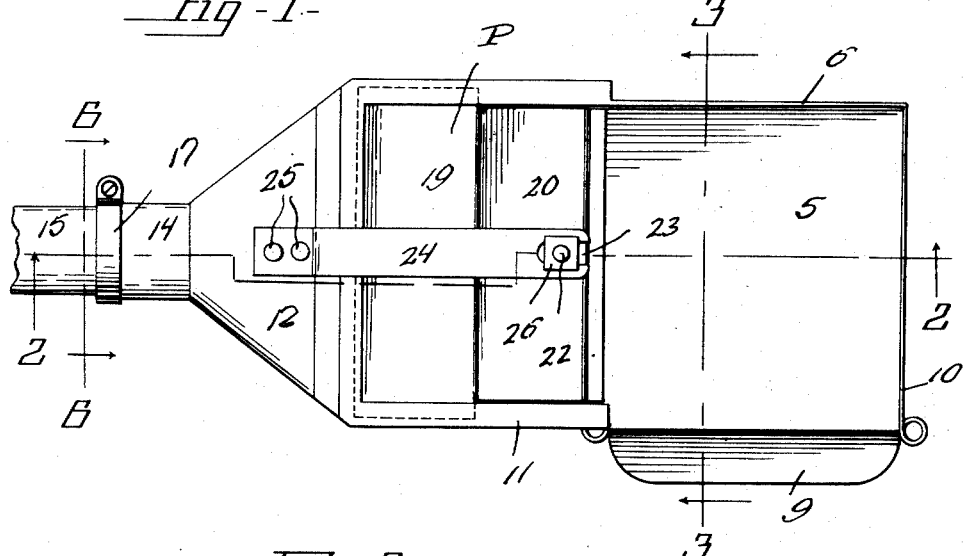
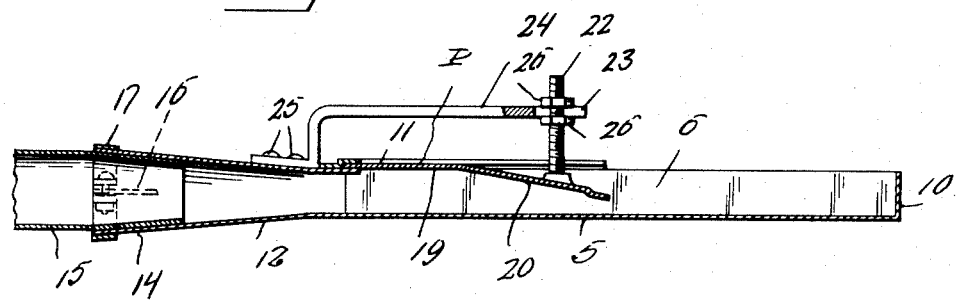
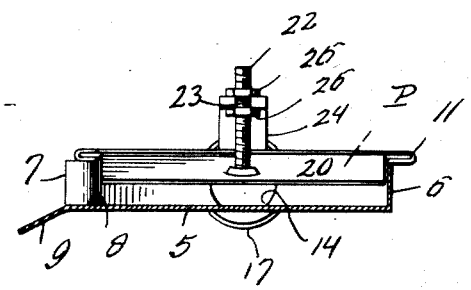
Inventor
Ward A. Winkie
By *Clarence A. O'Brien*
Attorney

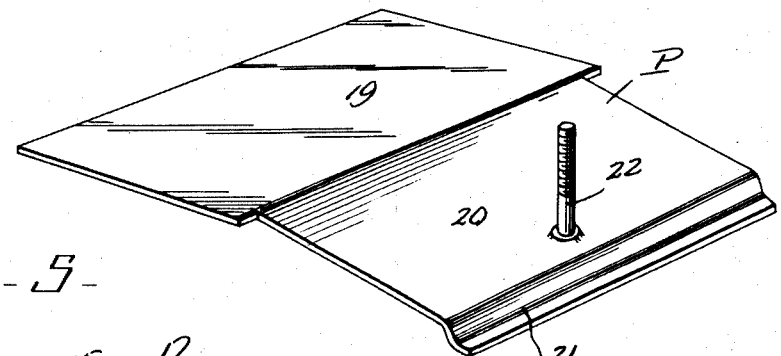
Fig-4-
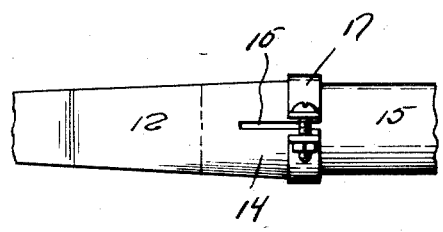
Fig-5-
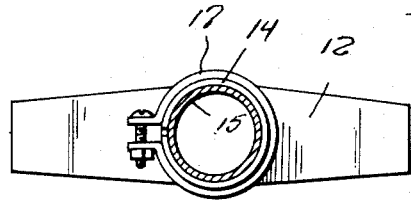
Fig-6-
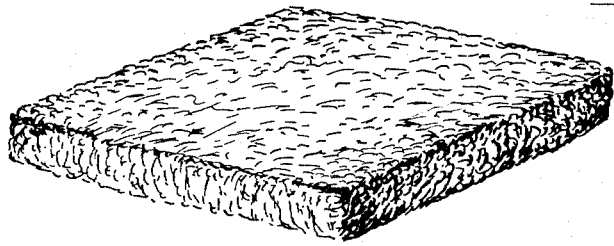
Fig-7-

Patented Jan. 15, 1929.

1,699,086

UNITED STATES PATENT OFFICE.

WARD A. WINKIE, OF BURNETT, WISCONSIN.

HAMBURGER-CAKE-FORMING APPARATUS.

Application filed March 26, 1928. Serial No. 264,774.

The present invention relates to an apparatus for forming hamburger cakes and has for its prime object to provide a structure which may be attached on a sausage stuffer and in which hamburger cakes of uniform size may be made without the necessity of handling the hamburger with the hands in any way thereby making the device thoroughly sanitary.

Another very important feature of the invention resides in the provision of adjustable means for regulating the thickness of the hamburger cakes formed. A still further very important object of the invention resides in the provision of a device of this nature which is exceedingly simple in its construction, inexpensive to manufacture, strong and durable, thoroughly efficient and reliable in use, and otherwise well adapted to the purpose for which it is designed. With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the construction embodying the features of my invention, Figure 2 is a longitudinal vertical section therethrough taken substantially on the line 2—2 of Figure 1, Figure 3 is a transverse vertical section taken substantially on the line 3—3 of Figure 1, Figure 4 is a perspective view of the spring plate, Figure 5 is an enlarged detail elevation of the attachment between the device and a sausage stuffer outlet tube, Figure 6 is a detail transverse section taken substantially on the line 6—6 of Figure 1, and Figure 7 is a perspective view of one of the hamburger cakes.

Referring to the drawing in detail it will be seen that the mold comprises a bottom 5 of elongated substantially rectangular formation having a longitudinal side wall 6 rising therefrom throughout its length and a longitudinal side wall 7 extending from one end to an intermediate portion, the inner end of the wall 7 being offset inwardly as is indicated at 8 in Figure 3. The remaining portion of the longitudinal edge of the bottom 5 adjacent the offset end 8 of the wall 7 is provided with a downwardly and outwardly inclined lip 9. An end wall 10 rises from one end edge of the bottom 5 from one end of the side wall 6 to one end of the lip 9. A channel frame 11 of U-shaped formation is mounted with one leg on the wall 6, the other leg on the wall 7 and the bight thereof extending transversely above the bottom 5 at the end remote without having the end wall 10. On this said remote end of the mold there extends a tapered funnel 12 merging into a tubular portion 14 adapted to telescope over the outlet tube 15 of a sausage stuffer. The sleeve 14 may be slit longitudinally as is indicated at 16 and a band clip 17 may be used to clamp the same firmly on the outlet tube 15. A spring plate is noted generally by the letter P and includes the relatively wide portion 19 and a relatively narrow portion 20 merging from one end thereof and inclining downwardly therefrom terminating in a curved end 21.

The threaded stud 22 rises from the relatively narrow portion 21 through a slot 23 in the end of an L-bracket 24 riveted or otherwise securely mounted as at 25 on the funnel 12. Nuts 26 are threaded on the stud 22 so that the angle of the portions 20 to the portion 19 of the plate P may be varied to regulate the thickness of the hamburger cakes being formed. From the above detailed description it will be seen that when the sausage meat is forced from the outlet tube 15 into the tubular portion 14 and through the funnel 12 into the bowl that the thickness of the hamburger cake will be regulated by the angle of the portion 20 to the portion 19 which angle may be varied by adjustment of the nut 26 so as to fill the right hand end of the mold as illustrated in Figures 1 and 2. A paddle or the like is then slipped in under the hamburger cake by using the lip 9 as the starter for the paddle and then the hamburger cake lifted up and will be cut off from the remaining portion of the sausage meat by the edge of the curved end 21. It is thought that the construction, operation, utility and advantages of this invention will now be quite apparent to those skilled in this art without a more detailed description thereof. The present embodiment of the invention has been disclosed in detail merely by way of example, since in actual practice it attains the features of advantage enumerated as desirable in the statement of the invention and the above description. It is apparent that changes in the details of construction, and in the combination and arrangement of parts may be resorted to without departing from the spirit or scope of the the invention as hereinafter claimed or sacrificing any of its advantages.

Having thus described my invention, what I claim as new is:

1. A device of the class described comprising a mold including a bottom, a side wall extending throughout the length of the bottom, another side wall extending throughout a portion of the length of the bottom, an end wall, a tubular member merging into the mold at one end thereof, a spring plate, means mounting the spring plate over a portion of the mold, and means for bending the spring plate to regulate the thickness of the hamburger cakes formed in the mold.

2. A device of the class described comprising a mold including a bottom, a side wall extending throughout the length of the bottom, another side wall extending throughout a portion of the length of the bottom, an end wall, a tubular member merging into the mold at one end thereof, a spring plate, means mounting the spring plate over a portion of the mold, means for bending the spring plate to regulate the thickness of the hamburger cakes formed in the mold, said means comprising a stud rising from the plate, a bracket arm having a slot through which said stud extends, and nuts threaded on the stud.

3. A device of the class described comprising a mold including a bottom, a side wall extending throughout the length of the bottom, another side wall extending thorughout a portion of the length of the bottom, an end wall, a spring plate, means mounting the spring plate over a portion of the mold, means for bending the spring plate to regulate the thickness of the hamburger cakes formed in the mold, said means comprising a stud rising from the plate, a bracket arm having a slot through which said stud extends, nuts threaded on the stud, a funnel merging from the mold and terminating in a split sleeve, and a clamp collar disposed about the split sleeve to engage the same on the outlet tube of a sausage stuffer.

In testimony whereof I affix my signature.

WARD A. WINKIE.